(12) United States Patent
Fernandez

(10) Patent No.: US 10,545,729 B2
(45) Date of Patent: Jan. 28, 2020

(54) COMPUTER PROGRAM INTERFACE

(71) Applicant: International Business Machines Corporation, Armonk, NY (US)

(72) Inventor: Genaro Nieto Fernandez, Barcelona (ES)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 13/657,099

(22) Filed: Oct. 22, 2012

(65) Prior Publication Data

US 2013/0117728 A1    May 9, 2013

(30) Foreign Application Priority Data

Oct. 20, 2011   (EP) ..................................... 11185994

(51) Int. Cl.
*G06F 8/30*    (2018.01)

(52) U.S. Cl.
CPC ...................... *G06F 8/30* (2013.01)

(58) Field of Classification Search
CPC ..... G06F 8/10; G06F 8/30; G06F 8/20; G06F 8/36; G06F 8/34
USPC ........................................................ 717/106
See application file for complete search history.

(56) References Cited

U.S. PATENT DOCUMENTS

| | | | |
|---|---|---|---|
| 7,792,853 B2 | 9/2010 | Subbian et al. | |
| 7,904,803 B2 | 3/2011 | Coulthard et al. | |
| 2003/0191657 A1* | 10/2003 | McQuilkin | G06Q 30/06 379/201.01 |
| 2008/0270153 A1 | 10/2008 | Drapkin et al. | |
| 2010/0042425 A1 | 2/2010 | Watson et al. | |
| 2010/0146396 A1* | 6/2010 | Able et al. | 715/735 |
| 2011/0035725 A9 | 2/2011 | Naik et al. | |
| 2014/0310654 A1 | 10/2014 | Jeon et al. | |

FOREIGN PATENT DOCUMENTS

| | | | |
|---|---|---|---|
| JP | 2002-091780 | 3/2002 | |
| JP | 2002-334058 | 11/2002 | |
| JP | 2002334058 A | * 11/2002 | ............ G06F 15/00 |
| JP | 2003-114874 | 4/2003 | |
| JP | 2003114874 A | * 4/2003 | ............ G06F 15/00 |
| KR | 2008/035427 | 4/2008 | |

OTHER PUBLICATIONS

Belushi, et al., "An Approach to Wrap Legacy Applications Into Web Services," Service Systems and Service Management, International Conf., Jun. 2007.
Sun, et al., "Software as a Service: An Integration Perspective," ICSOC, 2007.

* cited by examiner

*Primary Examiner* — Bing Zhao
*Assistant Examiner* — Hui-Wen Lin
(74) *Attorney, Agent, or Firm* — Steven M. Greenberg, Esq.; Shutts & Bowen LLP

(57) ABSTRACT

A method, apparatus and computer program product is disclosed for providing a software interface arranged to enable a first computer program to execute application logic of a second computer program, wherein said second program comprises display logic in close association with the application logic such that said application logic is operable via said display logic.

12 Claims, 8 Drawing Sheets

COMPUTER PROGRAM INTERFACE

CROSS-REFERENCE TO RELATED APPLICATIONS

This application claims priority under 35 U.S.C. § 119(a) to European Patent Application Serial Number 11185994.8, filed Oct. 20, 2011, entitled "COMPUTER PROGRAM INTERFACE", the entirety of which is incorporated herein by reference.

FIELD OF INVENTION

The present invention relates to a method, apparatus or computer program product for providing a software interface arranged to enable a first computer program to execute application logic of a second computer program, wherein said second program comprises display logic in close association with the application logic such that said application logic is operable via said display logic.

BACKGROUND OF THE INVENTION

Some computer programs are designed in such a way that they are difficult to integrate or interface with other software systems. This can be a particular problem with older computer programs often referred to as legacy programs. Programs can be difficult to integrate because of close coupling between the processing or application logic and the presentation or display logic of the program. This may result from the application and display logic being provided by a single program component. In other words, the program may be designed in such a way that is difficult to separate the user interface elements, in the form of display windows with data or command input and data output, from the data processing logic that is driven by the inputs to provide the relevant outputs.

One way of interfacing with such programs is via the original or existing user interface of the program using known methods such as screen scraping or via translation systems that translate all inputs and outputs of the program to provide for its integration into other software systems. Another way of interfacing such programs is to translate the program code into a suitable programming language so that it can be re-engineered for integration into other software systems. Such interfacing techniques are problematic in that they are time consuming, error prone and thus expensive. Furthermore, users of legacy programs may no longer hold the original code for an application. Legacy programs commonly sit at the core of a users organization or business and thus users may be reluctant to risk any change to such important systems.

SUMMARY OF THE INVENTION

A first embodiment of the invention provides a method for enabling a first computer program to execute application logic of a second computer program, wherein the second program comprises display logic in close association with application logic such that the application logic is operable via the display logic, the method comprising the steps of:
identifying a predetermined first display window associated with a selected application logic flow of the second computer program; and,
in response to the provision of the first display window by the second computer:

a) reading data from any predetermined output of the first display window for provision to the first computer program;
b) writing data to any predetermined input to the first display window for input to the second computer program; and
c) providing any predetermined execution command to the second computer program for initiating processing of the selected application logic flow associated with the first display window.

The method may comprise the further steps of:
identifying a predetermined set of one or more second display windows from the second computer program that may be provided immediately subsequent to the first display window in response to the processing of the selected application logic flow; and
in response to the provision of one of the second display windows by the second computer, performing steps a) to c) for the second display window.

The method may be arranged to enable the first computer to execute a plurality of selected application logic flows of the second computer program. In step b) the data may be input from the first computer program. The execution command may be a simulated user command. The selected application logic flow may be identified by a predetermined sequence of display windows and transitions between the display windows in the sequence are consequent on processing of one or more predetermined application logic elements associated with a given transition.

A second embodiment provides a method for generating computer program code for interfacing a first and second computer programs, wherein the second program comprises display logic in close association with application logic such that the application logic is operable via the display logic, the method comprising the steps of:

a) identifying a first display window associated with a selected application logic flow of the second application program;
b) assigning one or more display window outputs from the first display window for supply to the first computer program;
c) assigning one or more data inputs for input to the first display window for supply to the second computer program;
d) assigning one or more execution commands for input to the first display window for initiating the selected application logic flow associated with the first display window; and
e) creating program interface code arranged to provide an interface between the first and second computer programs for the selected application logic flow via the first display window and the associated display window outputs, data inputs and execution commands, the program code being arranged to perform the method in accordance with the first embodiment of the invention.

The method may comprise the further steps of:
identifying a predetermined set of one or more second display windows from the second computer program that may be provided immediately subsequent to the first display window in response to the processing of the selected application logic flow;
performing the steps b), c), and d) for each second display window; and
creating the program interface code arranged to provide an interface between the first and second computer programs for the selected application logic flow via the first and second display windows and the associated display window outputs, data inputs and execution commands, the program code being arranged to perform the method in accordance with the first embodiment of the invention.

The program code may be generated at least partly automatically from a predetermined flow definition of the selected application logic flow of the second application program. The flow definition may be at least partially graphically determined by a user.

A third embodiment provides apparatus for enabling a first computer program to execute application logic of a second computer program, wherein the second program comprises display logic in close association with application logic such that the application logic is operable via the display logic, the apparatus being operable to: identify a predetermined first display window associated with a selected application logic flow of the second computer program; and, in response to the provision of the first display window by the second computer:
a) read data from any predetermined output of the first display window for provision to the first computer program;
b) write data to any predetermined input to the first display window for input to the second computer program; and
c) provide any predetermined execution command to the second computer program for initiating processing of the selected application logic flow associated with the first display window.

A fourth embodiment provides apparatus for generating computer program code for interfacing a first and second computer programs, wherein the second program comprises display logic in close association with application logic such that the application logic is operable via the display logic, the apparatus being operable to:
a) identify a first display window associated with a selected application logic flow of the second application program;
b) assign one or more display window outputs from the first display window for supply to the first computer program;
c) assign one or more data inputs for input to the first display window for supply to the second computer program;
d) assign one or more execution commands for input to the first display window for initiating the selected application logic flow associated with the first display window; and
e) create program interface code arranged to provide an interface between the first and second computer programs for the selected application logic flow via the first display window and the associated display window outputs, data inputs and execution commands, the program code being arranged to provide the apparatus in accordance with the third embodiment of the invention.

A further embodiment provides a computer program stored on a computer readable medium and loadable into the internal memory of a computer, comprising software code portions arranged, when the program is run on a computer, for performing the method in accordance with the first embodiment. Another embodiment provides a method for providing a software interface for enabling a first program to execute application logic in a second program, the second program having display logic in close association with application logic including one or more user interface elements such that the application logic is operable via the display logic, the method comprising:

the interface causing the execution of the second program;
the interface accepting input arguments from the first program for the application logic of the second program and providing the input arguments to the second program via the one or more user interface elements;
the interface providing output data from the second program to the first program, the output data being extracted from one or more user interface elements of the second program.

BRIEF DESCRIPTION OF THE DRAWINGS

Embodiments of the invention will now be described, by way of example only, with reference to the accompanying drawings in which.

DETAILED DESCRIPTION OF EMBODIMENTS OF THE INVENTION

Figure 1:
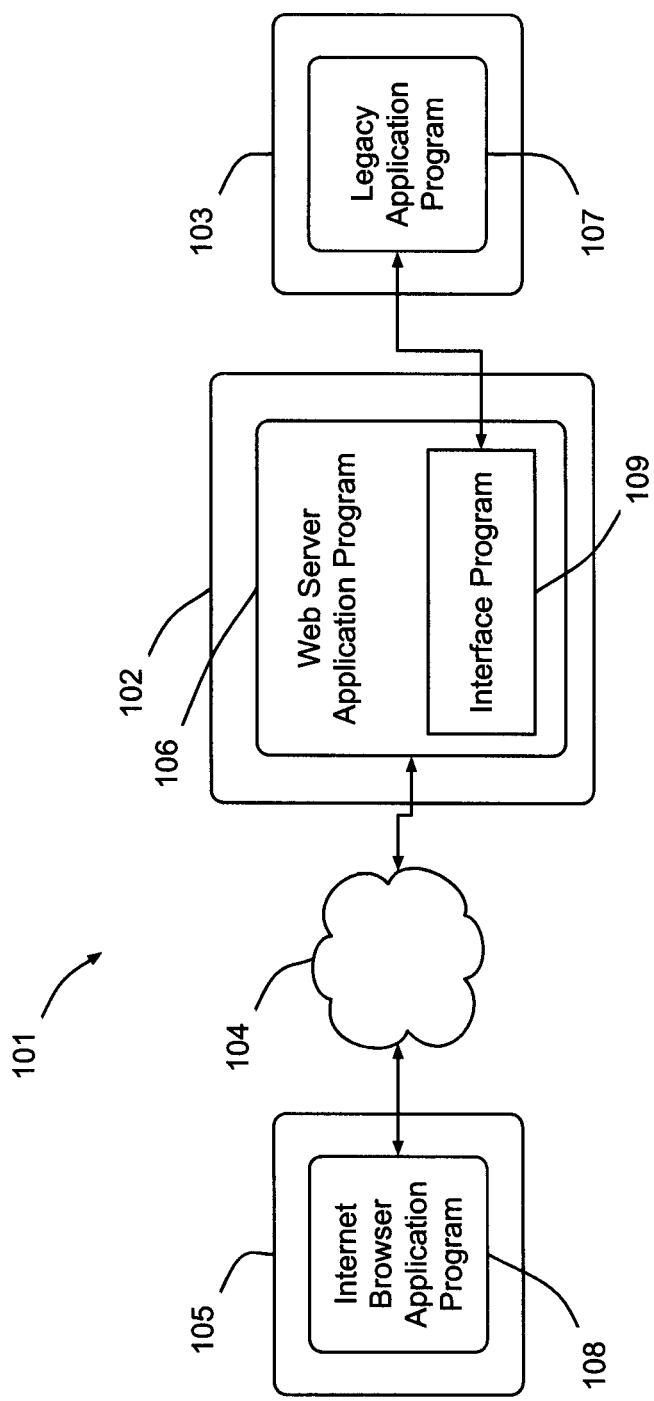
FIG. 1 is a schematic illustration of a computer system in which a first computer program is interfaced with a second computer program via an interface program.

With reference to FIG. 1, a computer system 101 comprises a first computer 102 connected to a second computer 103. The first computer is also connected via a network 104 to a third computer 105. In the present embodiment, the first computer 102 is loaded with a first computer program 106 in the form of a web server application program and the second computer 103 is loaded with a second computer program 107. In the present embodiment, the web server application 106 is arranged to make the facilities provided by the second computer program 107 available via the network 104 to the user of the third computer 105 via a web browser application program 108 installed on the third computer 105. In other words, the web server application 106 is arranged as a wrapper for the second computer program 107.

In the present embodiment, the second application 107 is a legacy application program designed without an interface for communication with other application programs such as the web server application 106. The web server application 106 is therefore provided with an interface program 109 for interfacing with the second application 107. The legacy application 107 is designed with its data presentation elements, such as screens or display windows, integrally coded with the associated data processing logic and thus not separately reusable. In other words, the display logic of the legacy application 107 is provided in close association with the application logic. The interface program 109 is arranged to interface the web server and legacy application programs 106, 107 via selected display screens of the legacy application 107 so as to enable the web server application 106 to execute selected application logic in the legacy application 107.

In the present embodiment, the second computer 103 is an IBM™ AS/400 computer. The legacy application 107 is originally designed for use via a terminal in the form of an IBM™ 5250 terminal. In the present embodiment, the interface program 109 is arranged to use IBM™ Host on Demand libraries, available from the IBM™ Corporation, to access the display logic of the legacy application 107 directly on the IBM™ AS/400 computer without the need for an IBM™ 5250 terminal.

Figure 2:
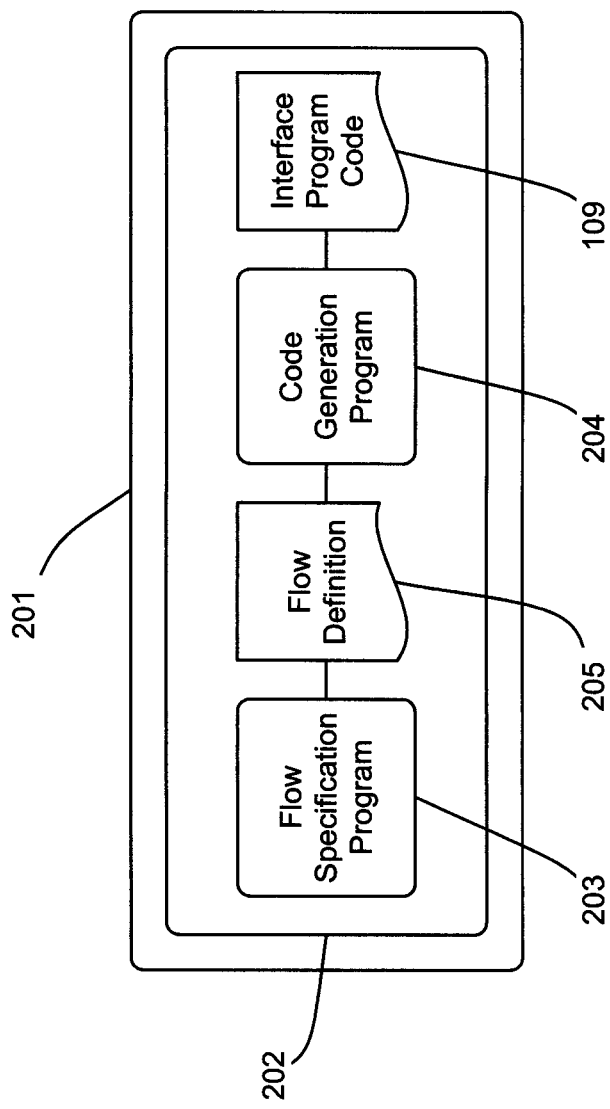
FIG. 2 is schematic illustration of a computer system for producing the interface program of FIG. 1.

With reference to FIG. 2, a fourth computer 201 is loaded with a software development environment (SDE) program 202 in the form of the Eclipse™ SDE from the Eclipse Foundation™, Inc. In the present embodiment, the SDE 202 is arranged to provide a flow specification program 203 and a code generation program 204. The flow specification program 203 is arranged to enable a user to specify a selected processing flow in the legacy application 107. In the present embodiment, the flow specification program 203 is arranged to enable the user to specify the selected processing flow graphically as described further below with reference to FIG. 4. In response to such user specification, the flow specification program 203 outputs a flow definition 205, which is input to the code generation program 204. The code generation program 204 is arranged to produce the code for the interface program 109 from the input flow definition 204 as described further below.

Figure 3:
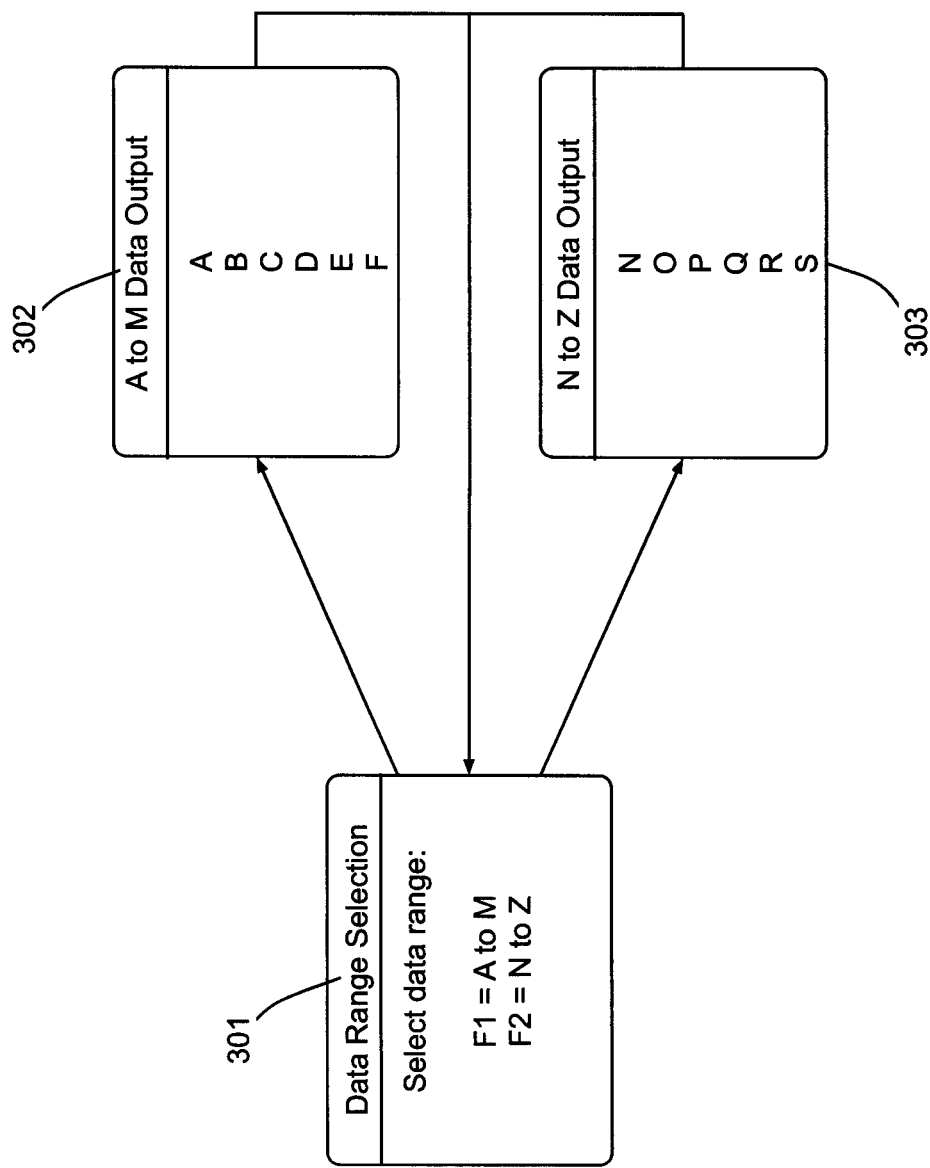
FIG. 3 is a schematic illustration of the flow of display windows provided during selected processing of the second computer program of FIG. 1.

In the present embodiment, the legacy program 107 is arranged with a user interface comprising a set of display windows designed for display to a user as screens of an appropriate terminal. The display windows may comprise one or more user interface elements in the form of input fields, output fields and may be arranged to accept one or more user inputs in the form of commands for instructing the legacy program 107 to perform the processing logic associated with a given display window. In the present embodiment, the interface program 109 is arranged to interface with selected functionality or flows of processing logic of the legacy program 107 with the selected functionality being identified by the associated flow of display windows. FIG. 3 shows an example of a set of display windows 301, 302, 303 associated with a selected data display function from the legacy program 107. The selected data display function is initiated by a first display window 301, which provides a menu of the available data ranges available for display. The first display window 301 provides for a user to input a command to select a data range, that is, data in the range A to M or data in the range N to Z. In response to such a command, the legacy program 107 displays the available data in the selected range in either the second or third of the display windows 302, 303 in dependence on the selected data range, before returning the first display window 301.

Figure 4:
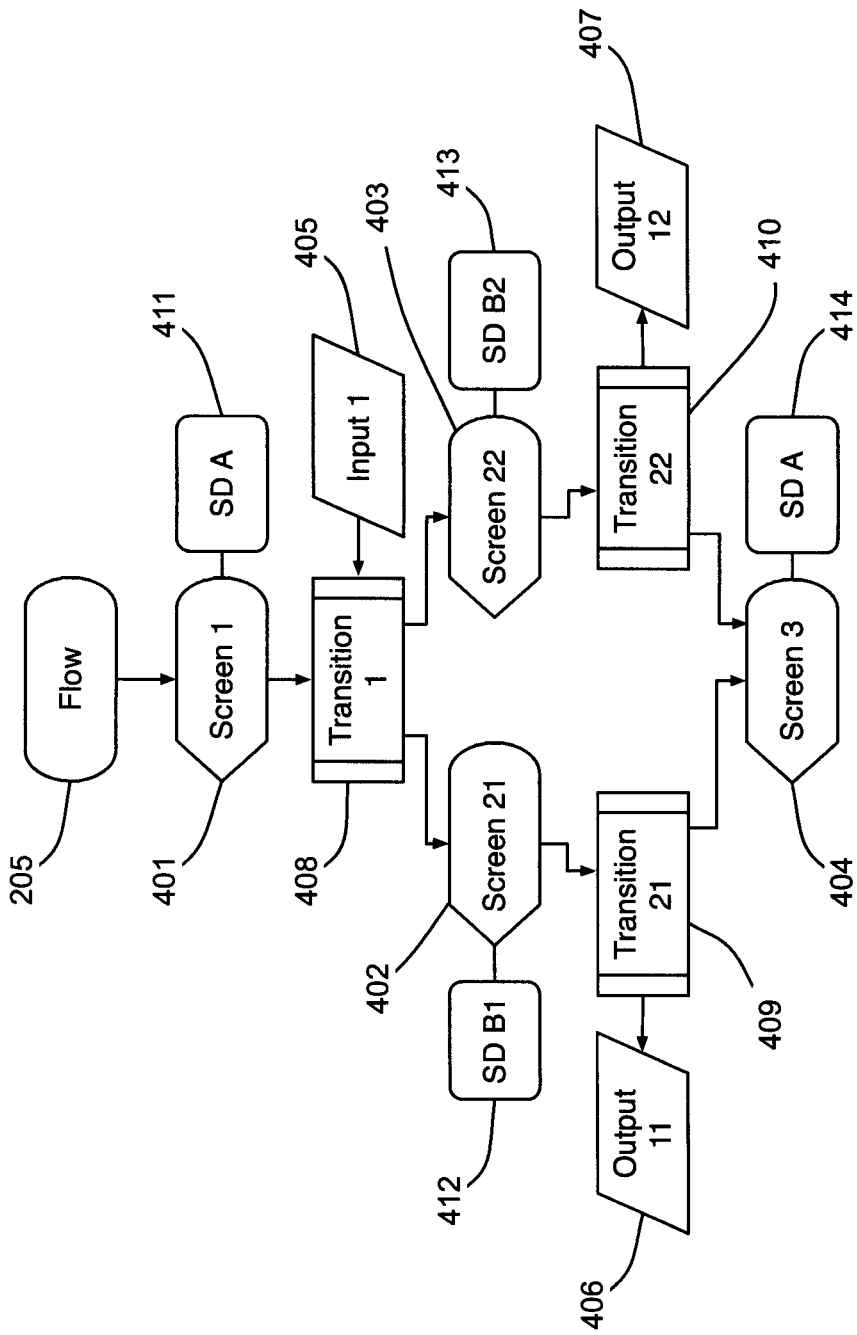
FIG. 4 is a graphical representation of the selected processing flow corresponding to the flow of display windows of FIG. 3.

With reference to FIG. 4, the flow specification program 203 is arranged to enable the user to specify the selected processing logic of the legacy program 107 as a flow definition 205 identifying the associated display windows 401, 402, 403, 404, inputs 405 and outputs 406, 407. Transitions 408, 409, 410 between screens are specified and represent the points in the selected processing where data or commands are input or data is output. The transitions 408, 409, 410 each represent a corresponding element of the selected application logic flow processed by the legacy application 107. Each of the screens 401, 402, 403, 404 is provided with a respective screen description 411, 412, 413, 414 that serve as a unique identifier for the respective screen. Some screens may appear more than once in a given transition but may have different outcomes as is the case in FIG. 4 and screens 1 & 3 401, 404 that have the same screen description "A" 411, 414. While from FIG. 3 the sequence of display windows may be viewed as a loop, from the point of a single flow of the processing logic the screens 1 & 3 401, 404 represent the start and end points of the processing respectively. The interface program 109 uses the screen descriptions, as described further below, for identifying the current position at any given time in the processing of the legacy program 107. In the present embodiment, the Eclipse Modelling Framework (EMF) is used to create the flow definitions 205 as described above.

Figure 5:
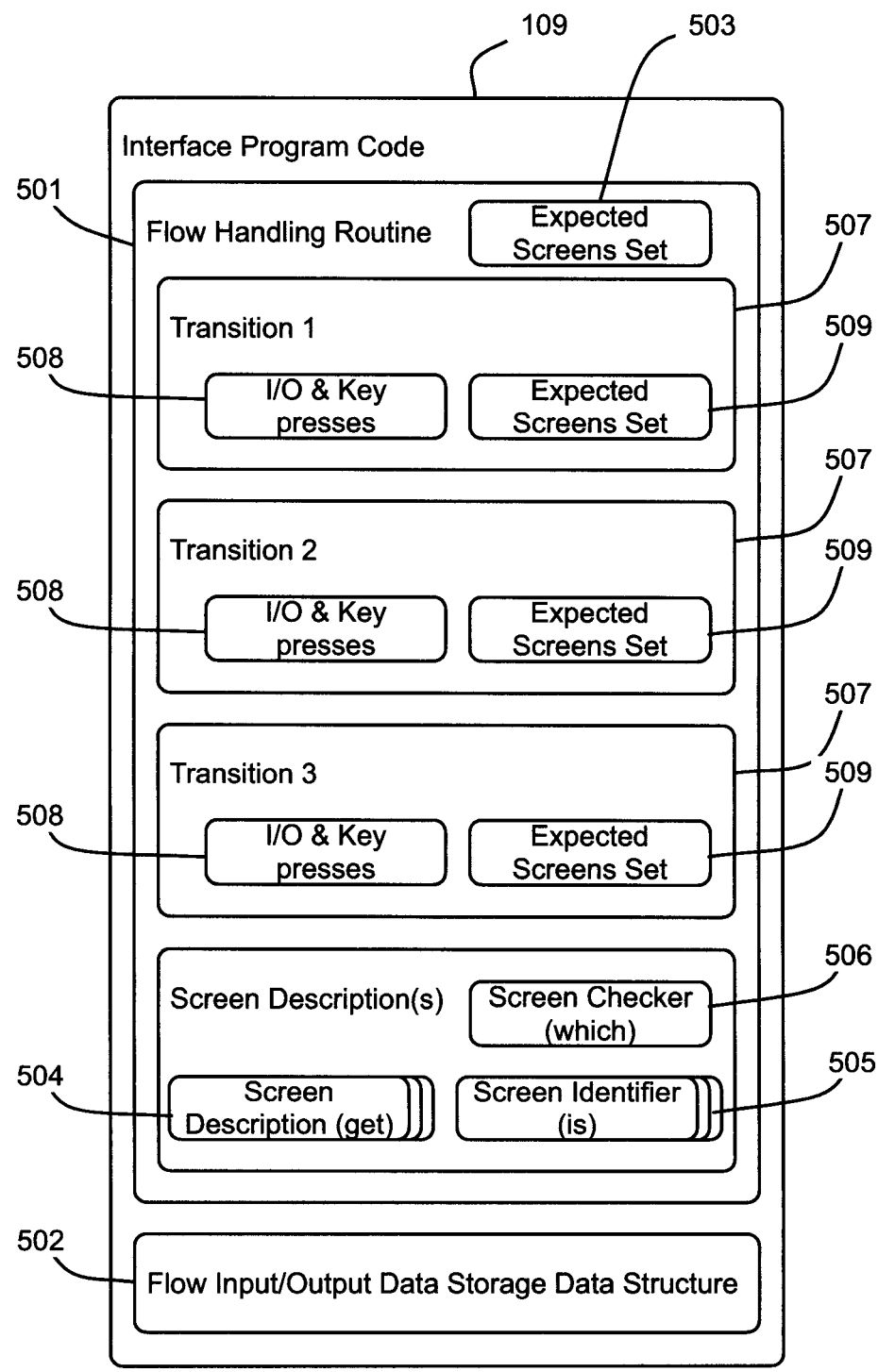
FIG. 5 is a schematic illustration of the structure of the interface program of FIG. 1 for interfacing the selected processing flow of FIG. 4.

With reference to FIG. 5, the code generation program 204 is arranged, in the present embodiment, to generate Java™ code for the interface program 109 from the flow definition 205. FIG. 5 illustrates the functional elements of the generated Java™ code. As will be understood by those skilled in the art, the interface program 109 may be arranged to provide interfacing to a set of one or more selected processing logic flows from the legacy program 107. In the present embodiment, each such selected processing logic flow is interfaced by a corresponding interface routine in the form of a flow handling class 501 and a data handling class 502. The flow handling class 501 provides the entry point into the interface program 109 and performs the interfacing activity with the legacy program 107. The data handling class 502 provides the necessary data structures for the input and output data 405, 406 and command inputs 407. The data handling class 502 comprises the interface between the interfacing program 109 and the web server application 106. The flow handling class 501 is provided with a set of expected screen descriptions 503 which are used by the flow handling class 501 to identify the state of the legacy application 107, for example, to determine when it is at the start point of its processing to perform the selected functionality.

The flow handling class 501 further comprises a set of screen description methods 504 and a set of screen identifier methods 505, one for each of the screens 401, 402, 403, 404 in the flow definition 205. The screen description methods 504 hold the respective screen descriptions 411, 412, 413, 414. The screen identifier methods 505 are arranged to compare a screen description 411, 412, 413, 414 obtained from the corresponding screen description method 504 to identify the current screen of the legacy program 107. The screen description methods 504 and a set of screen identifier methods 505 are used by a screen checker method 506 that is arranged to input a set of a set of screen descriptions, such as the expected screen descriptions 503, and provide an identification of which, if any, of the identified screens is the current screen of the legacy application 107.

The flow handling class further comprises a set of transition methods 507, one for each of the transitions 408, 409, 410 in the flow definition 205. Each transition method 507 is arranged to perform the interfacing of any of the inputs, outputs or commands 508 assigned to a given transition in the flow definition 205. Thus a transition method 507 may be arranged to transfer data from a display window of the legacy program 107 into a corresponding data structure provided by the data handling class 502 for output to the web server application 106. Similarly, a transition method 507 may be arranged to transfer data from the relevant data structure provided by the data handling class 502 to the specified input field of a display window of the legacy application 107. A transition method 507 may also be arranged to input a command, such as a simulated key press, to the legacy application 107 for initiating the processing of the legacy program associated with the given transition.

Each transition method 507 is also provided with an expected screen set 508 that identifies the possible destination screens that follow the given transition in accordance with the flow definition 205 and also identifies the relevant transition method 507 associated with each such possible destination screen. Each transition method 507 is thus further arranged, once the assigned processing of inputs, outputs or commands has been completed, to identify which screen of the expected screen set 509 is being indicated by the legacy program 107. Once the new current screen is thus identified the transition method 507 is arranged to call the next transition method 507 corresponding to the new current screen as defined in the flow definition 205. In summary, each transition method 507 is arranged to perform the following functions:
1. Read data from any assigned output from the current legacy application display window;
2. Write data to any assigned input of the current legacy application display window;
3. Determine the set of display windows expected to result from the processing of the current transition;
4. Execute the current transition by providing a command to the legacy application; and
5. Identify resulting screen and executing corresponding transition method.

Figure 6:
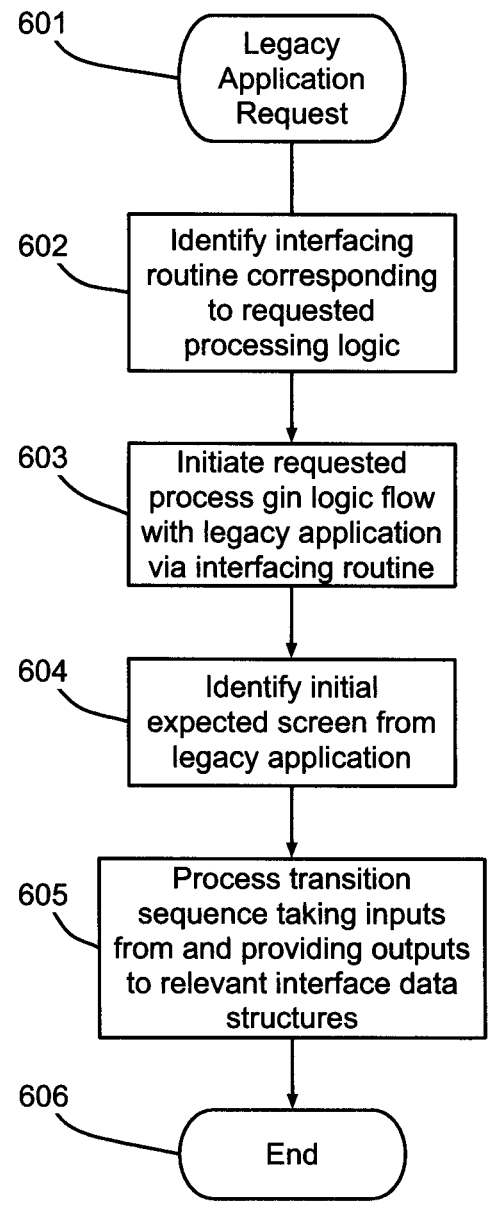
FIG. 6 is a flow chart illustrating the processing performed by the interface program when providing an interface to the second computer program.

The processing performed by the interface program 109 in response to a request from the web server application 106 for the predetermined selected functionality provided by the legacy application 107 will now be described in further detail with reference to the flow chart of FIG. 6. Processing is initiated at step 601 in response to a request from the web server application 106 and processing moves to step 602. At step 602 the interfacing routine corresponding to the selected processing logic flow request by the web server application 106 is identified and processing moves to step 603. At step 603 communication with the legacy application 107 is initiated via the identified interfacing routine and processing moves to step 604. At step 604 the initial screen for the interfacing routine is awaited and once provided processing moves to step 605. At step 605 the sequence of transitions specified for the interfacing routine is processed taking inputs and commands from the relevant interface data structures and providing outputs to the relevant interface data structures. Once processing of the sequence of transitions is complete processing moves to step 606 and ends.

Figure 7:
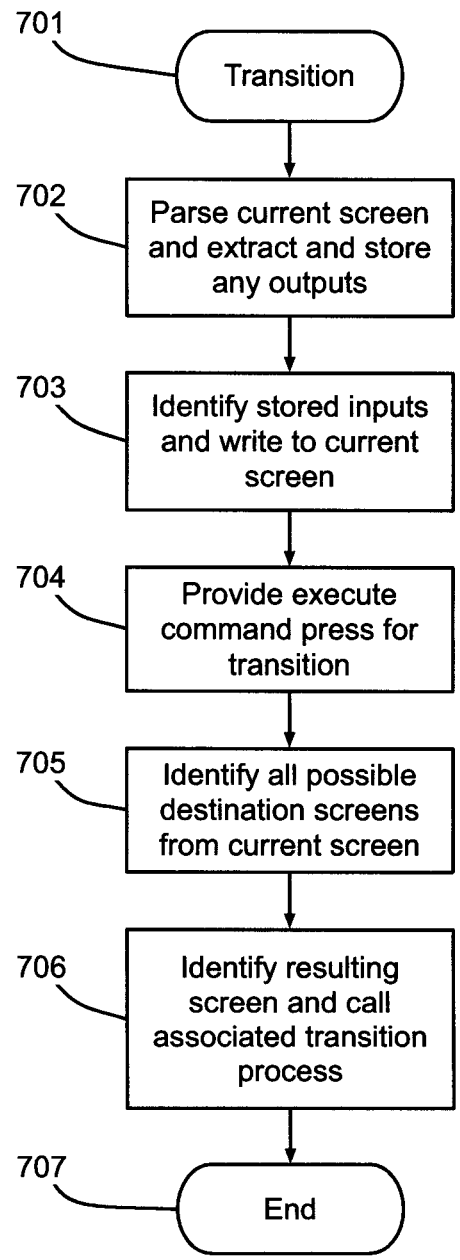
FIG. 7 is a flow chart illustrating the processing performed by the interface program in response to a given display window of the second computer program.

The processing by the interface program 109 of a given transition 507 will now be described in further detail with reference to the flow chart of FIG. 7.

Processing is initiated at step 701 either from the entry point of a flow handling routine 501 or by another transition 507 and processing moves to step 702. At step 702 the contents of the current screen are retrieved from the legacy application 107 via the appropriate HoD™ library routine and parsed to extract any predetermine outputs from the screen, that is, any outputs that have been assigned to the transition in the flow definition 205. The extracted output is then stored in the relevant data structure 502 for access by the web server application program 106 and processing moves to step 703. At step 703 any data inputs for the legacy program 107 are transferred from the relevant data structure 502 to the current screen of the legacy program 107 via the appropriate HoD™ library routine and processing moves to step 704. At step 704 any command inputs for the legacy program 107 are provided to the legacy program 107 via the appropriate HoD™ library routine and processing moves to step 705. At step 705 all possible destination screens from the current screen are identified from the expected screen set 509 and processing moves to step 706. At step 706 the output of the legacy program 107 is interrogated via the appropriate HoD™ library routine, the new current screen identified from the possible destination screens and the corresponding transition method 507 is called. Processing then moves to step 707 and ends for the current transition method 507.

Figure 8:
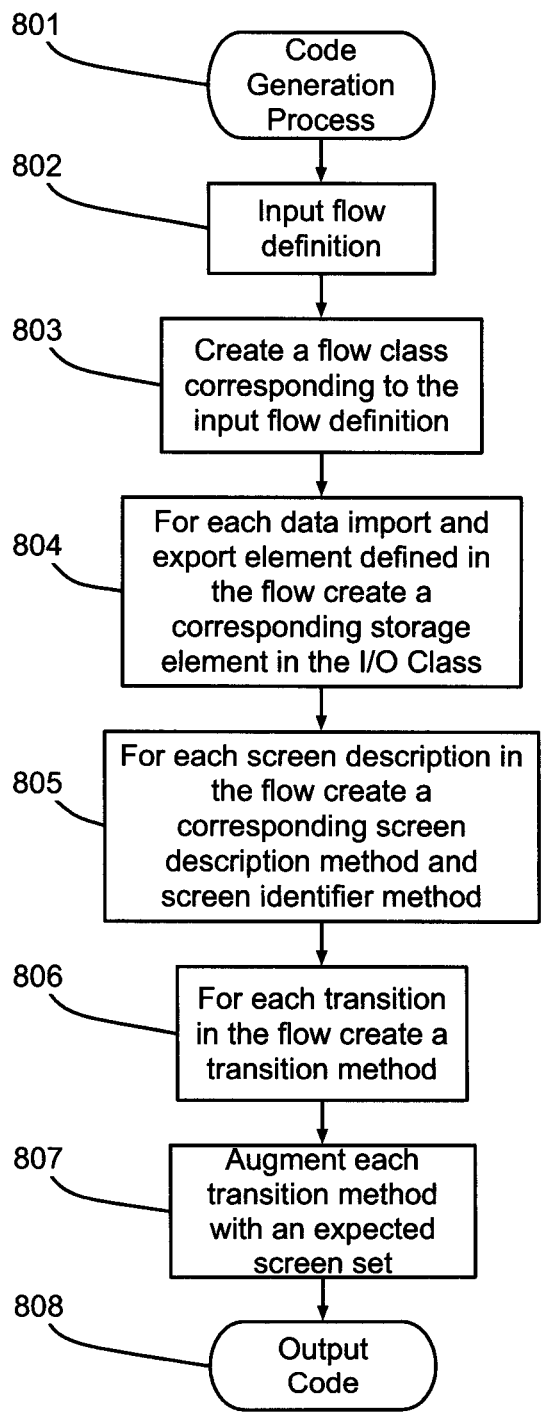
FIG. 8 is a flow chart illustrating the processing performed by the code generation program of FIG. 2 when generating the interface program of FIG. 5 from the graphical representation of the selected processing flow of FIG. 4.

The processing performed by the code generation program 204 to generate the interface program code 109 from the flow definition 205 will now be described in further detail with reference to the flow chart of FIG. 8. Processing is initiated at step 801 and moves to step 802 where the relevant flow definition 205 in EMF is input. Processing then moves to step 803 where the interface program code 109 is initialised with a flow handling routine 501 in the form of a flow class corresponding to the input flow definition 205 and processing moves to step 804. At step 804 a flow input/output data structure 502 is created comprising data storage elements corresponding to each input and output 405, 406, 407 defined in the flow definition 205 and processing moves to step 805. At step 805 a screen description class is created comprising a screen description method 504 and a screen identifier method for each of the screens 401, 402, 403, 404 in the flow definition 205 along with a screen checker method 506 and processing moves to step 806. At step 806 a transition method 507 is created for each transition 408, 409, 410 in the flow definition 205 and processing moves to step 807. At step 807 each transition method 507 is augmented with a corresponding expected screen set 503 and corresponding transition method. Processing then moves to step 808 where the interface code 109 is output and processing ends.

The interface program 109 may be provided with a plurality of flow handling routines 501 for providing access to each of a selected set of processing logic flows 205 of the legacy program or system 107.

In another embodiment, the interface program is provided with error handling functionality for dealing with incorrect or unexpected behaviour of the legacy program and handling such behaviour appropriately, for example, by reporting the error to the application program with which it is being interfaced.

In a further embodiment, the flow definition may comprise subroutines, conditions or loops for facilitating the description of more complex processing logic in the program being interfaced.

Embodiments of the invention are arranged to generate interface code for operating with the presentation of the interfaced program. Host-access methods such as IBM Java Host-On-Demand™ which supports host-access methods for systems including legacy systems such as TN3270E, TN5250, VT100, VT220, VT420. The interface code thereby provides the legacy logic in a modern runtime environment by engaging with the presentation to interface to the legacy component.

As will be understood by those skilled in the art, the above teachings are not limited to the creation of interface programs in Java™ but may be used for any suitable software language.

While the flow definition described above is performed graphically, it will be understood by those skilled in the art that the selected application logic flow may be defined by any other suitable means.

As described above, the interface programs as described above make use of existing HoD™ library routines for accessing specific legacy systems. As will be understood by those skilled in the art, such library routines may be provided for any suitable system. The functions of such system access routines may be provided as part of the function of embodiments of the interfacing program. Furthermore, any such libraries may be obtained from third party providers or developed specifically for a given application, that is, by custom development.

Embodiments of the invention are not restricted for use with so-called legacy systems but may be provided for interfacing with any computer program via the display windows thereof to drive selected processing logic of that program.

Embodiment of the invention provide a tool for generating code to integrate legacy software components into modern software environments such as service Orientated Architectures (SOA), where the legacy components include a tight coupling between logic and presentation, in other words, the presentation and logic are linked in one component.

Computer programs contain commonplace ancillary software elements and structures dependent on the software language being used and the systems on which such software is intended to run. Such elements and structures are not included in the above description to aid its clarity but will be obvious to those in the art.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the representative apparatus and method, and illustrative examples shown and described. Accordingly, departures may be made from such details without departure from the spirit or scope of applicant's general inventive concept.

The invention claimed is:

1. A method comprising:
receiving in an interface module executing in memory of an application server executing in a third computer and which is disposed between a legacy application executing in a first computer, and a Web browser executing in a second computer, a request from the Web browser directed to a logic flow of the legacy application, the interface module comprising a data structure adapted to store data received from the legacy application for provision to the Web browser, and data received from the Web browser for input into the legacy application;
loading a flow definition of the interface module, the flow definition specifying processing logic of the legacy program including a multiplicity of different functions, inputs thereto and outputs therefrom, and an arrangement of display screens, each corresponding to one of the different functions;
identifying in the flow definition of the interface module, an interfacing routine portion corresponding to the directed logic flow of the request from the Web browser, the directed logic flow of the request comprising different ones of the functions and associating each of the different ones of the functions with a different one of the display screens of the legacy application, and further specifying an initial display screen of the legacy application, each of the associated different ones of the display screens of the legacy application being arranged in a flow of display screens;
initializing communication by the interface module with the legacy application using the interfacing routine portion and awaiting a presentation by the legacy application of the initial display screen specified by the interfacing routine portion; and,
detecting by the interfacing routine portion a presentation of the initial display screen in the legacy application and responsive to detecting the presentation of the initial display screen in the legacy application, performing by computer program instructions of the interfacing routine portion executing in the application server:
selecting a transition method stored in the interfacing routine portion, the transition method comprising a keystroke recognizable in the legacy application and operable to initiate processing in the legacy application to present a corresponding display in the legacy application, a specification of data to be received from the corresponding display and data to be input into the legacy application through the corresponding display presented in accordance with the keystroke, and a list of possible next display screens from which a next display screen is presented by the legacy application from the corresponding display presented in accordance with the keystroke;
receiving from the corresponding display by the interfacing routine portion into the data store, the data specified by the transition method to be received from the corresponding display presented in accordance with the keystroke, and providing the data specified by the transition method as input to the corresponding display in the legacy application;
directing input of the keystroke in the legacy application through the corresponding display presented in accordance with the keystroke,
retrieving the list of possible next display screens associated with the initial display screen and identifying in the corresponding display of the legacy application, via a library routine of the interface module, a next display screen from amongst the display screens in the list; and,
upon detecting a presentation of the next display screen by the legacy application, selecting a new transition method stored in the interfacing routine portion and repeating the receiving, directing and retrieving utilizing the new transition method.

2. The method of claim 1, wherein the first computer is a mid-range computing system accessible by remotely coupled terminal.

3. The method of claim 2 wherein the interface module is a Telnet protocol driven adapter accessing display logic of the legacy application outside of the remotely coupled terminal.

4. The method of claim 1, wherein the legacy application comprises a set of display windows defined for presentation as display screens of the remotely coupled terminal, each of the display screens providing one or more input or output fields, and accepting user inputs as commands instructing the legacy application, each of the display screens having associated therewith processing logic of the legacy application.

5. A data processing system comprising:
a host computer with memory and at least one processor and disposed between a legacy computer program executing in a first computer, and a Web browser executing in a second computer;
an interface module comprising computer program instructions executing in an application server operating in the memory of the host computer, the computer program instructions performing:
receiving in the interface module a request from the Web browser directed to a logic flow of the legacy application, the interface module comprising a data structure adapted to store data received from the legacy application for provision to the Web browser, and data received from the Web browser for input into the legacy application;
loading a flow definition of the interface module, the flow definition specifying processing logic of the legacy program including a multiplicity of different functions, inputs thereto and outputs therefrom and an arrangement of display screens, each corresponding to one of the different functions;
identifying in the flow definition of the interface module, an interfacing routine portion corresponding to the directed logic flow of the request from the Web browser, the directed logic flow of the request comprising different ones of the functions and associating each of the different ones of the functions with a different one of the display screens of the legacy application, and further specifying an initial display screen of the legacy application, each of the associated different ones of the display screens of the legacy application being arranged in a flow of display screens;
initializing communication by the interface module with the legacy application using the interfacing routine portion and awaiting a presentation by the legacy application of the initial display screen specified by the interfacing routine portion; and,
detecting by the interfacing routine portion a presentation of the initial display screen in the legacy application and responsive to detecting the presentation of the initial display screen in the legacy application, performing by computer program instructions of the interfacing routine portion executing in the application server:
selecting a transition method stored in the interfacing routine portion, the transition method comprising a keystroke recognizable in the legacy application and operable to initiate processing in the legacy application to present a corresponding display in the legacy application, a specification of data to be received from the corresponding display and data to be input into the legacy application through the corresponding display presented in accordance with the keystroke, and a list of possible next display screens from which a next display screen is presented by the legacy application from the corresponding display presented in accordance with the keystroke;
receiving from the corresponding display by the interfacing routine portion into the data store, the data specified by the transition method to be received from the corresponding display presented in accordance with the keystroke, and providing the data specified by the transition method as input to the corresponding display in the legacy application;
directing input of the keystroke in the legacy application through the corresponding display presented in accordance with the keystroke,
retrieving the list of possible next display screens associated with the initial display screen and identifying in the corresponding display of the legacy application, via a library routine of the interface module, a next display screen from amongst the display screens in the list; and,
upon detecting a presentation of the next display screen by the legacy application, selecting a new transition method stored in the interfacing routine portion and repeating the receiving, directing and retrieving utilizing the new transition method.

6. The system of claim 5, wherein the first computer is a mid-range computing system accessible by remotely coupled terminal.

7. The system of claim 6 wherein the interface module is a Telnet protocol driven adapter accessing display logic of the legacy application outside of the remotely coupled terminal.

8. The system of claim 5, wherein the legacy application comprises a set of display windows defined for presentation as display screens of the remotely coupled terminal, each of the display screens providing one or more input or output fields, and accepting user inputs as commands instructing the legacy application, each of the display screens having associated therewith processing logic of the legacy application.

9. A computer program stored on a non-transitory computer readable storage medium and loadable from the storage medium into the internal memory of a computer, comprising software code portions arranged, when said program is executed in memory of a computer, for performing:
receiving in an interface module executing in memory of an application server executing in a third computer and which is disposed between a legacy application executing in a first computer, and a Web browser executing in a second computer, a request from the Web browser directed to a logic flow of the legacy application, the interface module comprising a data structure adapted to store data received from the legacy application for provision to the Web browser, and data received from the Web browser for input into the legacy application;
loading a flow definition of the interface module, the flow definition specifying processing logic of the legacy program including a multiplicity of different functions, inputs thereto and outputs therefrom, and an arrangement of display screens, each corresponding to one of the different functions;
identifying in the flow definition of the interface module, an interfacing routine portion corresponding to the directed logic flow of the request from the Web browser, the directed logic flow of the request comprising different ones of the functions and associating each of the different ones of the functions with a different one of the display screens of the legacy application, and further specifying an initial display screen of the legacy application, each of the associated different ones of the display screens of the legacy application being arranged in a flow of display screens;

initializing communication by the interface module with the legacy application using the interfacing routine portion and awaiting a presentation by the legacy application of the initial display screen specified by the interfacing routine portion; and, detecting by the interfacing routine portion a presentation of the initial display screen in the legacy application and responsive to detecting the presentation of the initial display screen in the legacy application, performing by computer program instructions of the interfacing routine portion executing in the application server:

selecting a transition method stored in the interfacing routine portion, the transition method comprising a keystroke recognizable in the legacy application and operable to initiate processing in the legacy application to present a corresponding display in the legacy application, a specification of data to be received from the corresponding display and data to be input into the legacy application through the corresponding display presented in accordance with the keystroke, and a list of possible next display screens from which a next display screen is presented by the legacy application from the corresponding display presented in accordance with the keystroke;

receiving from the corresponding display by the interfacing routine portion into the data store, the data specified by the transition method to be received from the corresponding display presented in accordance with the keystroke, and providing the data specified by the transition method as input to the corresponding display in the legacy application;

directing input of the keystroke in the legacy application through the corresponding display presented in accordance with the keystroke, retrieving the list of possible next display screens associated with the initial display screen and identifying in the corresponding display of the legacy application, via a library routine of the interface module, a next display screen from amongst the display screens in the list; and, upon detecting a presentation of the next display screen by the legacy application, selecting a new transition method stored in the interfacing routine portion and repeating the receiving, directing and retrieving utilizing the new transition method.

10. The computer program of claim 9, wherein the first computer is a mid-range computing system accessible by remotely coupled terminal.

11. The computer program of claim 10, wherein the interface module is a Telnet protocol driven adapter accessing display logic of the legacy application outside of the remotely coupled terminal.

12. The computer program of claim 9, wherein the legacy application comprises a set of display windows defined for presentation as display screens of the remotely coupled terminal, each of the display screens providing one or more input or output fields, and accepting user inputs as commands instructing the legacy application, each of the display screens having associated therewith processing logic of the legacy application.

* * * * *